No. 97,246.  
N. THOMPSON.  
LANTERN.  
PATENTED NOV. 23, 1869

Witnesses:

United States Patent Office.

NATHAN THOMPSON, OF BROOKLYN, E. D., NEW YORK.

Letters Patent No. 97,246, dated November 23, 1869; antedated November 10, 1869.

IMPROVEMENT IN LANTERNS.

The Schedule referred to in these Letters Patent and making part of the same.

*To all whom it may concern:*

Be it known that I, NATHAN THOMPSON, of the Eastern District of Brooklyn, in the county of Kings, and State of New York, have invented a new and useful Improvement in "Lanterns," of which the following is a full, clear, and exact description, reference being had to the accompanying drawing, forming part of this specification, and in which—

Figure 1:
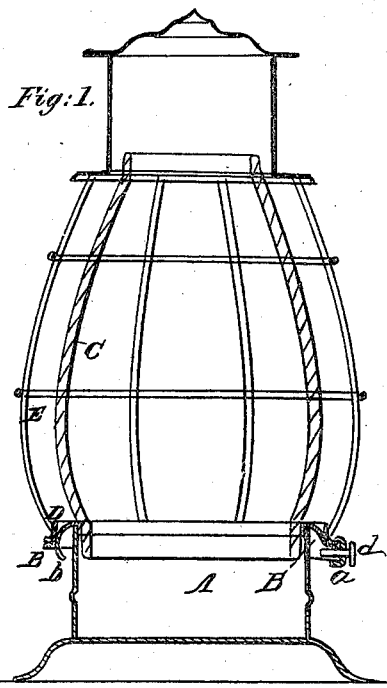
Figure 2:
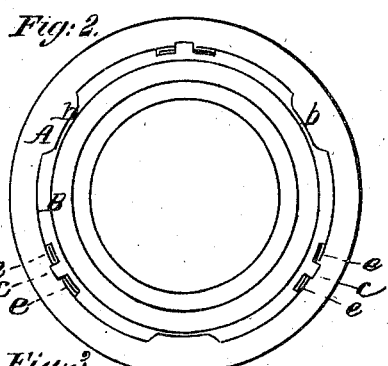
Figure 4:
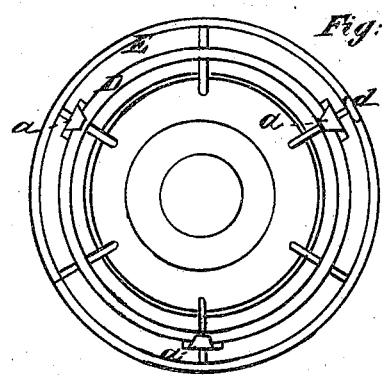
Figure 3:
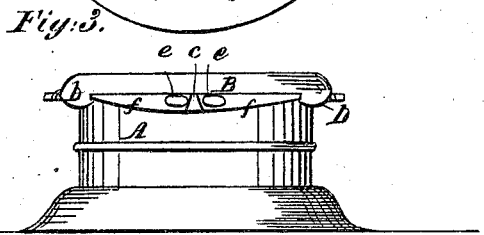

Figure 1 represents a vertical section of a lantern constructed in accordance with my improvement;

Figures 2 and 3, a plan and side view of the lamp-holder, or base portion of the lantern; and Figure 4, an inverted plan of the cage-portion, with its bottom ring.

Similar letters of reference indicate corresponding parts.

My improvement relates to lanterns that are provided with a cage or shield, which is removable for the purpose of putting on and off the glass; and The invention consists in a novel and advantageous construction of the parts through which the cage is secured on or to the base-portion of the lantern, and removed therefrom as required.

Referring to the accompanying drawing—

A represents a lamp, holding a base part of the lantern, the upper portion or rim B of which may be termed the middle ring.

This ring, which is arranged to overhang externally the base part A, supports on its inner edge the glass C, and is of a bent or curved form, so as to receive upon it, in a gentle and easy manner, the lower ring D of the cage E, which ring is also bent and provided or formed with two, three, or more claws or clamps, $a\ a$, preferably arranged at an equal distance apart, and serving as, in putting on the cage E, they are entered through depressions formed by the bent-down portions $b\ b$, in the rim B, to hold the cage E on to said rim.

This is done by turning the cage with its lower ring D in either or opposite directions, so as to bring the claws $a\ a$ under the lower edges of the rim B, between the depressions $b\ b$, and until they strike against stops $c\ c$, on the rim B, when the cage may be locked or secured, by a set-screw or spring-bolt, $d$, being made to enter one of a series of holes, $e\ e$, formed in the rim B. It is preferred to give to the lower edge of this rim B, between the depressions $b\ b$, an inclined shape, or to form it with double and reversed inclines $f\ f$, on opposite sides of each stop $c$, for the purpose of bringing the cage E down to its seat, and restraining it from play or shake when establishing its connection with the base part A, as described, also for the purpose of facilitating its release when required.

To release or take off the cage, the spring-bolt or set-screw $d$ is drawn out of lock with its hole $e$, and the cage, with its ring D, turned so as to bring the claws $a\ a$ in line with the depressions $b\ b$, when said cage may be lifted off and the glass removed.

These depressions or bent-down portions $b\ b$ of the rim B are curved or shaped to form, as it were, guides for the claws, in fitting the cage on and off, and present no abrupt edge for the claws to catch against or under.

By a proper disposition or arrangement of the claws $a\ a$, depressions $b\ b$, with the intermediate edge or edges $f\ f$, stops $c\ c$, and apertures $e\ e$, the cage E may be readily connected and disconnected with the base part A, by turning it in either or opposite directions a slight distance only, and so that it is immaterial, in fitting on the cage, which depressions $b\ b$ the several claws $a\ a$ enter.

This construction of the parts for establishing and breaking connection of the cage and base-portion of the lantern allows of both the rim B and ring D being shaped or formed, and provided, as described, by a single blow or stamping action, and constitutes what may be termed an external clip-arrangement, as contradistinguished from an internally overhanging sectional construction of the base part, ring, and segmental flanges to the cage-ring, as in a previous arrangement recently patented to me, and which does not admit of the same facility of construction.

What is here claimed, and desired to be secured by Letters Patent, is—

The combination, with the cage-ring D, having claws or clamps $a\ a$, of the outwardly bent-over rim B, to the base part A, with its turned-down portions or depressions $b\ b$, intermediate clipping-edges or inclines $f\ f$, stops $c\ c$, and suitable apertures or formations for locking the cage, by means of a spring-bolt or other fastening, substantially as specified.

NATHAN THOMPSON.

Witnesses:
 FRED. HAYNES,
 J. W. COOMBS.